United States Patent
Abbaszadeh

(10) Patent No.: US 11,880,756 B2
(45) Date of Patent: Jan. 23, 2024

(54) SYSTEMS AND METHODS FOR IDENTIFYING ANOMALOUS NUCLEAR RADIOACTIVE SOURCES

(71) Applicant: The Regents of the University of California, Oakland, CA (US)

(72) Inventor: Shiva Abbaszadeh, Santa Cruz, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 298 days.

(21) Appl. No.: 17/453,068

(22) Filed: Nov. 1, 2021

(65) Prior Publication Data

US 2022/0230049 A1     Jul. 21, 2022

Related U.S. Application Data

(60) Provisional application No. 63/108,006, filed on Oct. 30, 2020.

(51) Int. Cl.
| | | |
|---|---|---|
| *G01T 1/36* | (2006.01) | |
| *G06N 3/04* | (2023.01) | |
| *G01T 7/00* | (2006.01) | |
| *G06N 3/08* | (2023.01) | |
| *G06N 3/065* | (2023.01) | |

(52) U.S. Cl.
CPC ............ *G06N 3/04* (2013.01); *G01T 1/36* (2013.01); *G01T 7/00* (2013.01); *G06N 3/065* (2023.01); *G06N 3/08* (2013.01)

(58) Field of Classification Search
CPC ............ G06N 3/04; G06N 3/065; G06N 3/08; G06N 3/045; G06N 3/049; G06N 3/063; G01T 1/36; G01T 7/00
See application file for complete search history.

(56) References Cited

U.S. PATENT DOCUMENTS

| | | |
|---|---|---|
| 2009/0287624 A1 | 11/2009 | Rouat et al. |
| 2015/0338525 A1 | 11/2015 | Valentino et al. |

FOREIGN PATENT DOCUMENTS

| | | |
|---|---|---|
| KR | 100473074 B1 | 3/2005 |
| KR | 102051576 B1 | 12/2019 |

OTHER PUBLICATIONS

Neckar et al., "Braindrop: A mixed-signal neuromorphic architecture with a dynamical systems-based programming model," Proceedings of IEEE, vol. 107, No. 1, pp. 144-164. (Year: 2019).*

Sharma, S. et al., "Anomaly Detection in Gamma Ray Spectra: Machine Learning Perspective," Proceedings of the 2012 IEEE Symposium on Computational Intelligence for Security and Defence Applications, Jul. 12, 2012, Ottawa, Canada, 8 pages.

(Continued)

*Primary Examiner* — Kiho Kim
(74) *Attorney, Agent, or Firm* — McCoy Russell LLP

(57) ABSTRACT

A system for identifying anomalous nuclear radioactive sources can include: a radiation detector configured to collect spectra data corresponding to a radioactive source; a multi-channel analyzer configured to convert the collected spectra data to at least one two-dimensional (2D) image; and a neuromorphic architecture that includes a plurality of neurons configured to detect a radioactive anomaly based on the at least one 2D image.

54 Claims, 6 Drawing Sheets

(56) References Cited

OTHER PUBLICATIONS

Aleotti, J. et al., "Detection of Nuclear Sources by UAV Teleoperation Using a Visuo-Haptic Augmented Reality Interface," Sensors, vol. 17, No. 10, Sep. 29, 2017, 22 pages.
Kamuda, M. et al., "An automated Isotope Identification and Quantification Algorithm for Isotope Mixtures in Low-Resolution Gamma-ray Spectra," Radiation Physics and Chemistry, vol. 155, Feb. 2019, 8 pages.
Liu, Z. et al., "Double Q-Learning for Radiation Source Detection," Sensors, vol. 19, No. 4, Feb. 24, 2019, 19 pages.
Camuñas-mesa, L. et al., "Neuromorphic Spiking Neural Networks and Their Memristor-CMOS Hardware Implementations," Materials, vol. 12, No. 17, Aug. 27, 2019, 28 pages.
Hellfeld, D. et al., "Real-time Free-moving Active Coded Mask 3D Gamma-Ray Imaging," IEEE Transactions on Nuclear Science, vol. 66, No. 10, Oct. 2019, 9 pages.
Romanchek, G. et al., "Kernel-based Gaussian process for anomaly detection in sparse gamma-ray data," PLoS ONE, vol. 15, No. 1, Jan. 23, 2020, 22 pages.
Gazula, S., "Learning and prediction of nuclear radioactive properties with artificial neural networks," Proceedings of the 1993 Third International Conference on Artificial Neural Networks, May 25, 1993, Brighton, UK, 5 pages.
ISA Korean Intellectual Property Office, International Search report and Written Opinion Issued in Application No. PCT/US2021/072158, dated Feb. 16, 2022, WIPO, 13 pages.

\* cited by examiner

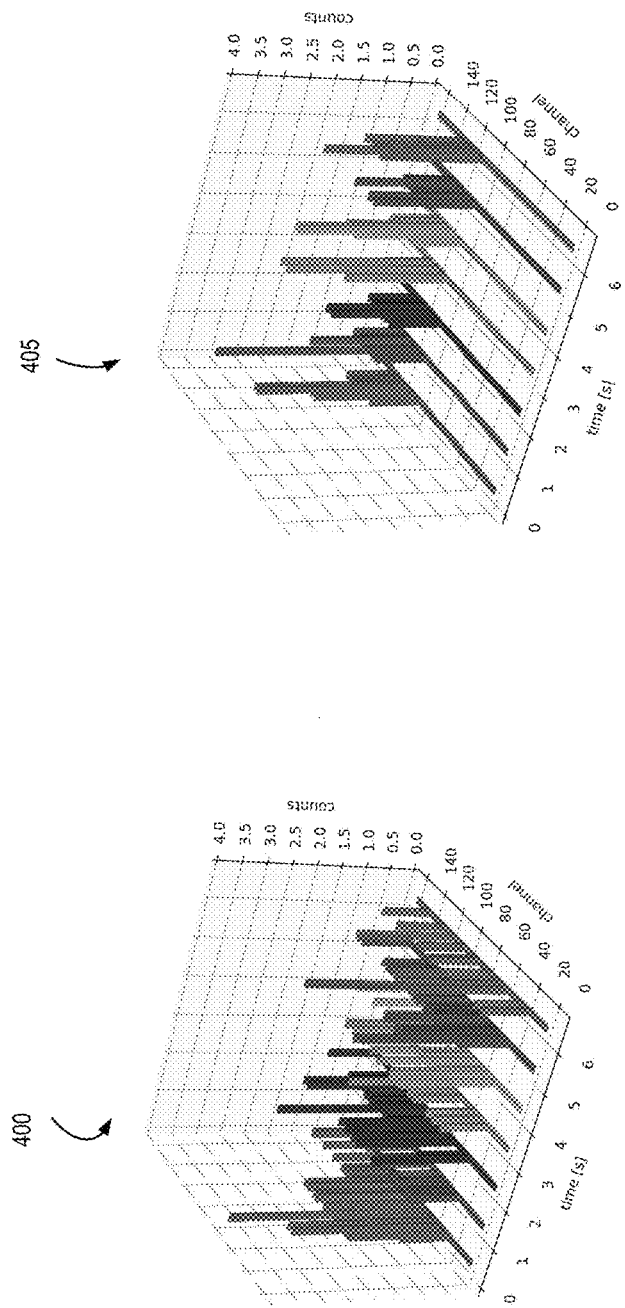
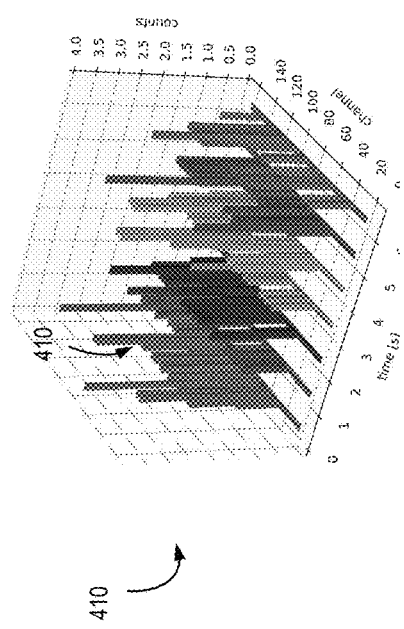
FIG. 4A
FIG. 4B
FIG. 4C

SYSTEMS AND METHODS FOR IDENTIFYING ANOMALOUS NUCLEAR RADIOACTIVE SOURCES

CROSS REFERENCE TO RELATED APPLICATION

The present application claims priority to U.S. Provisional Application No. 63/108,006, entitled "SYSTEMS AND METHODS FOR IDENTIFYING ANOMALOUS NUCLEAR RADIOACTIVE SOURCES," and filed on Oct. 30, 2020. The entire contents of the above-listed application are hereby incorporated by reference for all purposes.

TECHNICAL FIELD

This disclosure is directed to systems and methods for radiation detection, and more particularly to compact and efficient systems and methods for identification of anomalous nuclear radioactive sources.

BACKGROUND

Anomalous radioactive source detection is a critical concept for various areas of concern such as public health, border security, and overall national security. However, previous attempted techniques generally require high detector output spectrum (e.g., greater than 125 counts per second) and post-processing of the data using a central processing unit (CPU) or general processing unit (GPU) machine. Indeed, such conventional hardware includes CPU-based or GPU-based equipment.

Fast evolution of machine learning (ML) methodologies has encouraged industry and research to explore hardware implementation beyond CPUs and GPUs. Consequently, neuromorphic computing is experiencing a resurgence to overcome efficiency bottlenecks of conventional parallel computing and will be the platform of choice for applications requiring small size, low weight, low power (SWaP) and fast computing. The design and development of components and architectures whose functions are simulating the brain's spiking neural network (SNN) are the fundamental aspects of neuromorphic computing. For the past few years, multiple large-scale neuromorphic platforms have been developed and tested. However, these platforms are costly to construct, rely on proprietary hardware, and are not readily accessible to most of the community.

Thus, there remains a need for improved isotope identification including compact portable devices having low power, fast processing e, and capability to process extremely sparse data.

SUMMARY

Implementations of the disclosed technology are generally directed to systems and methods for real-time monitoring of the sparse detector output in high radiation background for isotope identification. Implementations may include compact, portable, and low-power electronics that can process extremely sparse data with fast processing time for anomaly detection. In certain implementations, an unmanned aerial vehicle (UAV) may be embedded with such a detector, which would be useful for radiation detection without unnecessary exposure to an operator.

Implementations may include a field-programmable gate array (FPGA)-based neuromorphic architecture that can be utilized for fast anomaly detection. Anomaly detection may be based on recognizing grayscale two-dimensional (2D) image data in which pixel intensity represents the counts in each channel.

Implementations may include a neuromorphic architecture that includes a fully parallel neural network with a chain of identical neurons that can learn and recognize the input information processed as different patterns. Each neuron may be used to store a prototype vector. The neurons may be fully connected through a parallel bus that could have bi-directional communication for write and readout. Each neuron may have the ability to learn and recall their pattern spontaneously without any supervision, and recognize the incoming signal by autonomously evaluating the distance between the reference patterns stored in their memory and input vectors. If this distance falls within a range called the active influence field, for example, the neuron may fire and return a decision that may consist of the distance, category, and neuron identifier. The system may advantageously learn the signature of a detector and differentiate the anomaly source from background.

BRIEF DESCRIPTION OF THE DRAWINGS

FIG. 4A illustrates an example of three-dimensional (3D) histograms of seven detected background spectra with channel number in x-axis, counts in y-axis, and time in z-axis.

FIG. 4B illustrates an example of the 3D histograms of the seven simulated source spectra in same time with those of FIG. 4A.

FIG. 4C illustrates an example of the seven spectra of the background plus the source in 3D histograms.

DETAILED DESCRIPTION

Machine learning methodologies such as support vector machine (SVM), kernel-based gaussian process, artificial neural network (ANN) and convolutional neural network (CNN) have been expanding the field in radiation detection. These advances have encouraged industry and research to explore hardware implementation beyond CPU and GPU-based systems. As Moore's law continues to reach its limitation, the spiking neural network (SNN) inspired by the human brain aims to emulate a realistic neural network model in biology, which can improve the computing efficiency, compactness, and power consumption performance. The main structure of the neural network in the human brain consists of neurons and synapses where the most important characteristics include neuron spiking and synaptic plasticity. Simulating brain and SNN from fundamental hardware scale is the idea of neuromorphic computing.

Implementations of the disclosed technology generally include a field-programmable gate array (FPGA)-based neuromorphic architecture and spiking neural network (SNN) that can be used for radiation anomaly detection. Such implementations may include compact, portable, and low-power electronics that can process extremely sparse data with fast processing time for anomaly detection. These implementations may be physically small, readily portable, and use reduced power and, as such, generally do not require saving large amounts of data, and cloud computing may be used for processing. For example, an unmanned aerial vehicle (UAV) may be embedded with such a detector for radiation detection without subjecting an operator to unnecessary radiation exposure.

Figure 1:
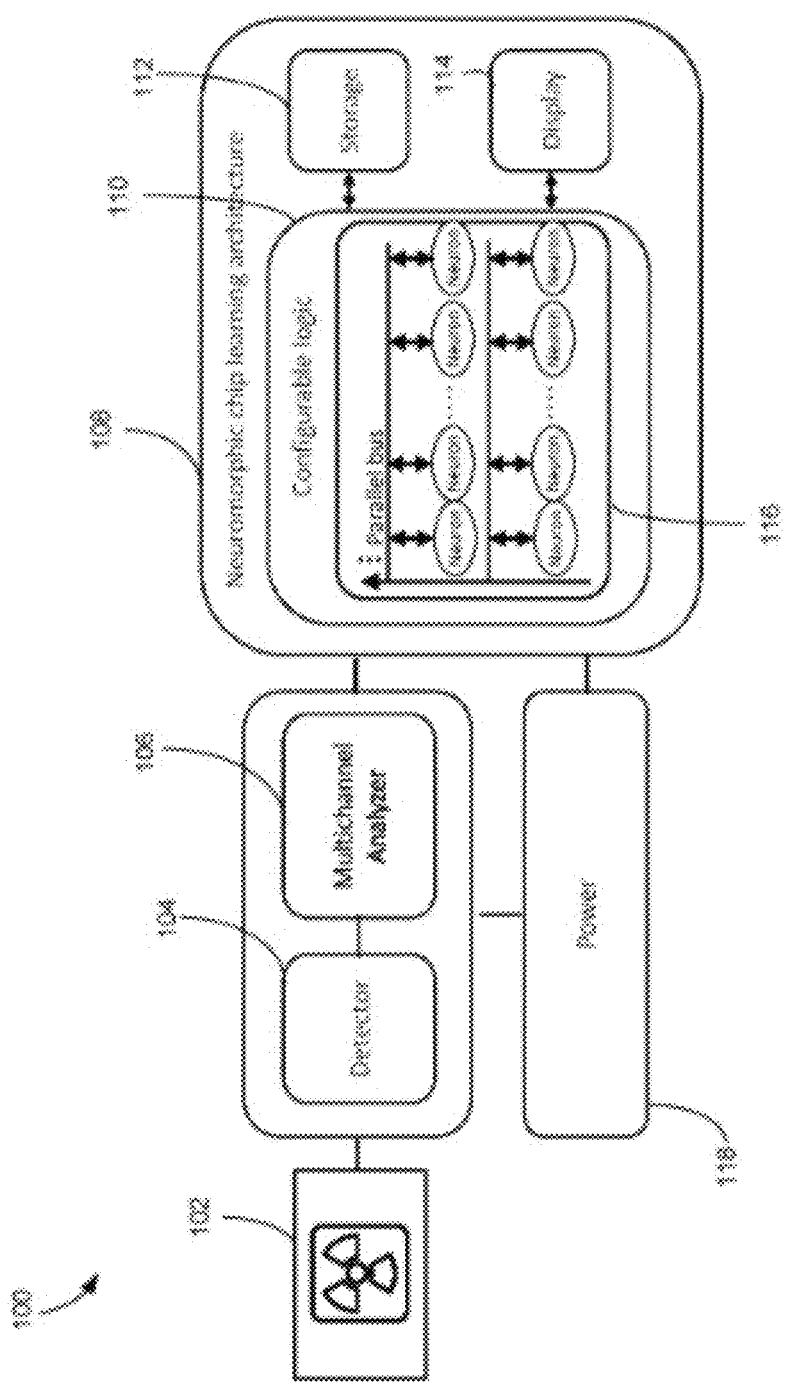
FIG. 1 is a block diagram illustrating an example of a system for identifying anomalous nuclear radioactive sources in accordance with certain implementations of the disclosed technology.

FIG. 1 is a block diagram illustrating an example of a system 100 for identifying anomalous nuclear radioactive sources in accordance with certain implementations of the disclosed technology. In the example, the system 100 includes a radiation detector 104 configured to collect spectra data corresponding to a radioactive source 102, a multi-channel analyzer 106 configured to convert the collected spectra data to at least one two-dimensional (2D) image, and a neuromorphic chip learning architecture 108 that includes configurable logic 110, e.g., SRAM, implementing a plurality of neurons 116 configured to detect a radioactive anomaly based on the at least one 2D image.

In the example, the neuromorphic architecture 108 is a fully parallel neural network and the plurality of neurons 116 includes a chain of identical neurons. The neuromorphic architecture also includes a parallel bus having bi-directional communication between the plurality of neurons 116.

The chain of identical neurons may be configured to learn and recognize the collected spectra data processed as different patterns, and each neuron in the chain of identical neurons may be configured to store a prototype vector. Each neuron in the chain of identical neurons may be configured to learn and recall its pattern spontaneously and autonomously evaluate a distance between reference patterns stored in a memory, e.g., a storage device 112, and input vectors.

Responsive to the distance falling within a specified range, e.g., an active influence field, for at least one neuron, the at least one neuron may be configured to fire and return a decision that may include, for example, any one or more of: the distance, a category, and an identifier corresponding to the neuron that fired.

In certain embodiments, the neuromorphic architecture may be configured to learn a signature corresponding to the radiation detector, and also differentiate the radioactive anomaly from the background based at least in part on the learned signature. Alternatively or in addition thereto, the neuromorphic architecture may be configured to memorize patterns from the background, and also detect the radioactive anomaly based at least in part on the memorized patterns.

In certain embodiments, each neuron in the chain of identical neurons is configured to recognize its pattern within a sliding window moving in the 2D image. In such embodiments, the neuron may be configured to store its pattern as a vector in a memory of the neuron, and the sliding window may determine the vector size.

In certain embodiments, the 2D image has a first axis denoting time and a second axis denoting channel number. The count of each channel, e.g., in 1,024 channels, may be converted to a pixel intensity, and the collected spectra data may be presented as a three-dimensional (3D) histogram that may have, for example, a first axis denoting channel number, a second axis denoting a count, and a third axis denoting present time.

In certain embodiments, the system 100 comprises a display 114 configured to visually display output results corresponding to the detected radioactive anomaly. The system 100 may also include at least one power source 118 to provide power for any or all of the detector 104, multi-channel analyzer 106, and neuromorphic architecture 108.

Figure 2:
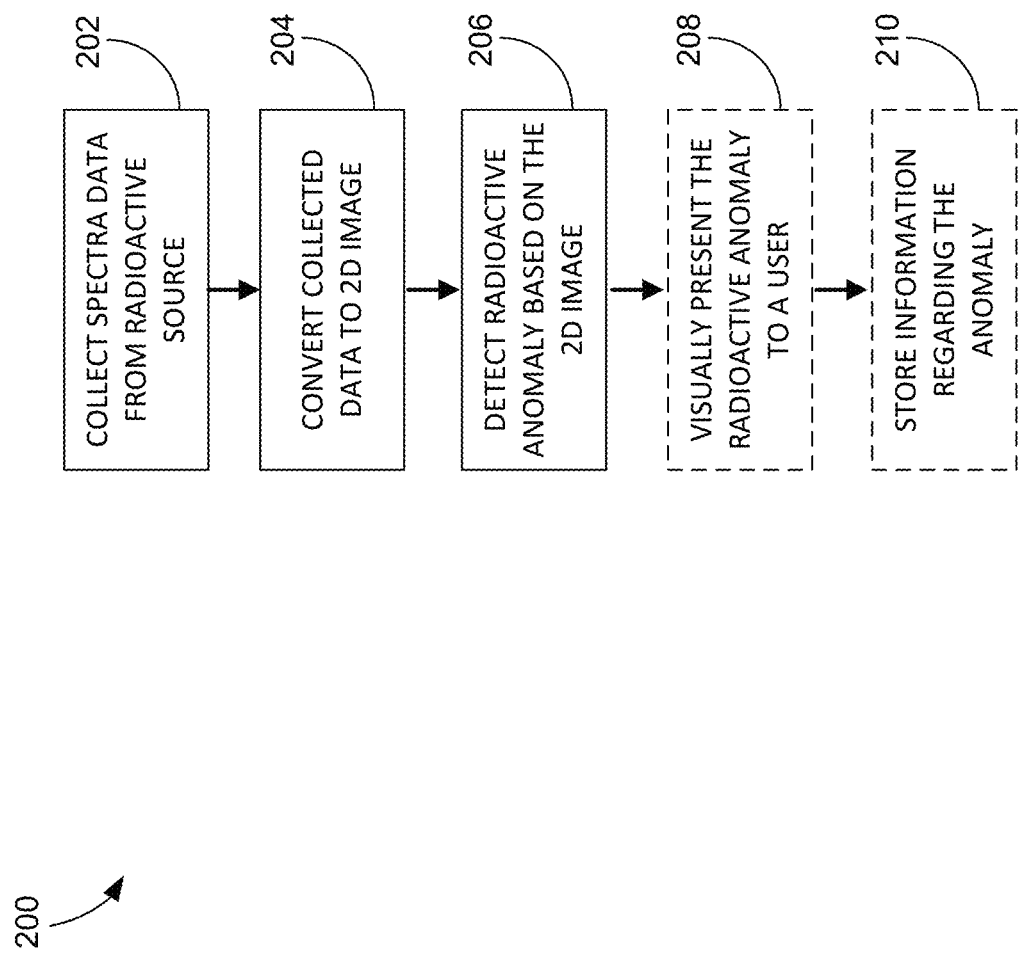
FIG. 2 is a flow diagram illustrating an example of a method for identifying anomalous nuclear radioactive sources in accordance with certain implementations of the disclosed technology.

FIG. 2 is a flow diagram illustrating an example of a method 200 for identifying anomalous nuclear radioactive sources in accordance with certain implementations of the disclosed technology.

At 202, a radiation detector, such as the radiation detector 104 of the system 100 illustrated by FIG. 1, collects spectra data corresponding to a radioactive source.

At 204, a multi-channel analyzer, such as the multi-channel analyzer 106 of the system 100 illustrated by FIG. 1, converts the spectra data collected by the radiation detector at 202 to at least one two-dimensional (2D) image.

At 206, a neuromorphic architecture that includes a plurality of neurons, such as the neuromorphic chip learning architecture 108 of the system 100 illustrated by FIG. 1, detects a radioactive anomaly based on the at least one 2D image that results from 204.

At 208, a display of the neuromorphic architecture, such as the display 114 of the system 100 illustrated by FIG. 1, visually presents output results corresponding to the detected radioactive anomaly.

At 210, a memory of the neuromorphic architecture, such as the storage 112 of the system 100 illustrated by FIG. 1, visually presents output results corresponding to the detected radioactive anomaly.

Figure 3:
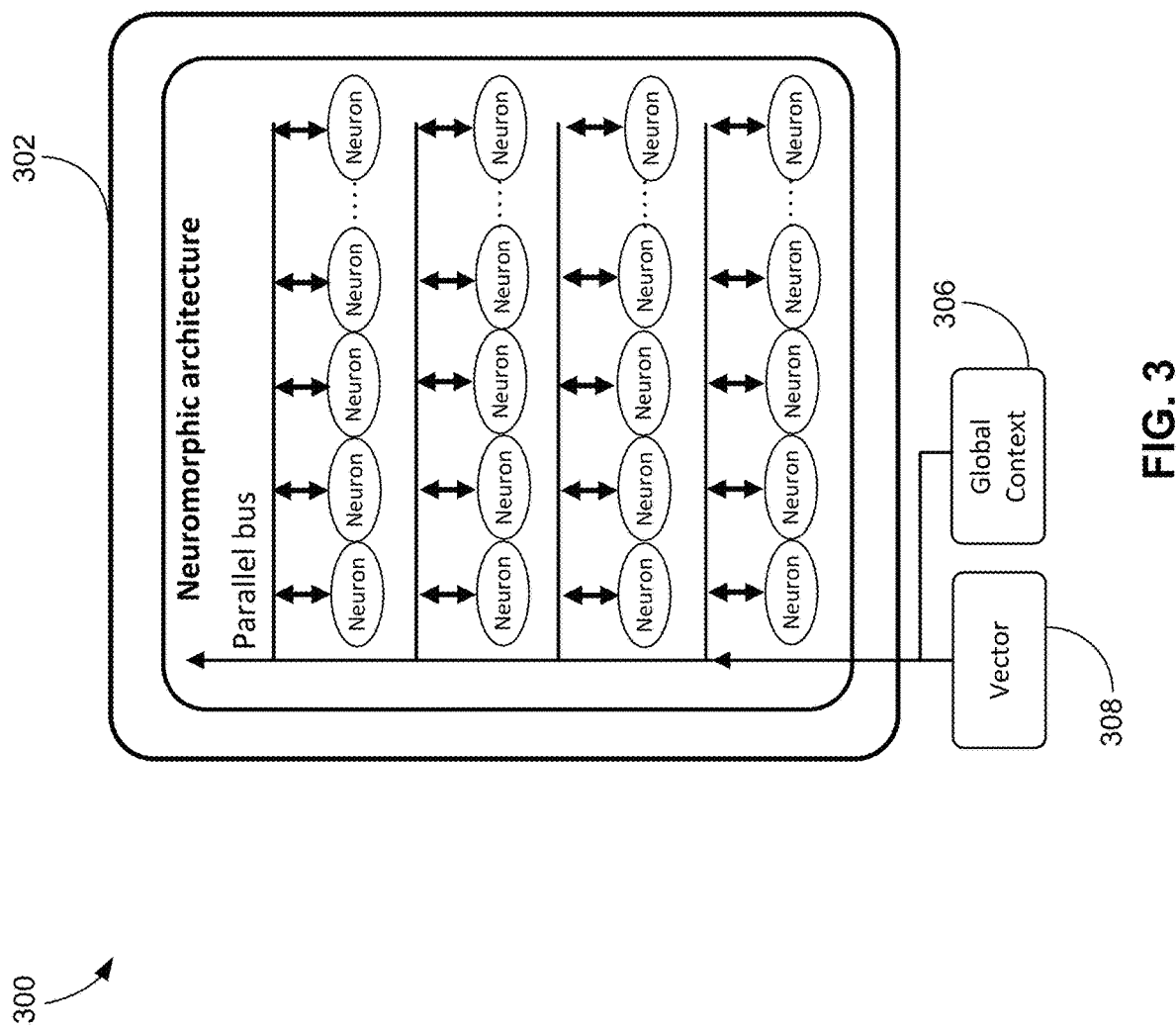
FIG. 3 is a block diagram illustrating an example of a neuromorphic architecture having a fully parallel neural network with a chain of identical neurons that can learn and recognize the input information processed as different patterns.

FIG. 3 is a block diagram illustrating an example of a system 300 having a neuromorphic architecture 302 that includes a fully parallel neural network with a chain of identical neurons that can each learn and recognize the input information processed as different patterns. In the example, the neurons are fully connected through a parallel bus that may have bi-directional communication to facilitate both write and readout actions, and each neuron may receive an input vector 308 and global context 306.

In the example, each neuron has the ability to learn and recall their model spontaneously without any supervision. They recognize the incoming signal by autonomously evaluating the distance between the reference models stored in their memory and input vectors 308, for example. If this distance falls within a range called the minimum influence field, the neuron may fire and return a decision that consists of the distance (active influence field), category, and neuron identifier or other suitable information.

In an example, background radiation was collected using a radiation detector and the background data has 14077 samples of spectra, each sample collected in 1 s. The average of the count rate is 40±16 counts/s. The background gamma-ray has an energy spectrum from 0-3 MeV because of naturally occurring radioactive material (NORM). The source spectra were statistically simulated where gammas: (i) emit via a Poisson random number with mean equal to source activity, (ii) are counted based on geometric efficiency, and (iii) are binned via $N(d,\sigma^2)$, where d represents the photopeak channel and $\sigma^2$ is defined by detector resolution.

FIGS. 4A-4C each show three-dimensional (3D) histograms 400, 405, 410 of seven detected background spectra with channel number in x-axis, counts in y-axis, and time in z-axis. In FIG. 4B, the 3D histograms of the seven simulated source spectra 405 are in the same time as those 400 in FIG. 4A. FIG. 4C shows the seven spectra 410 of the background plus the source in 3D histograms. The total channel number is 1024 but, for better viewing, only 20-140 channels are exhibited in the example.

Figure 5B:
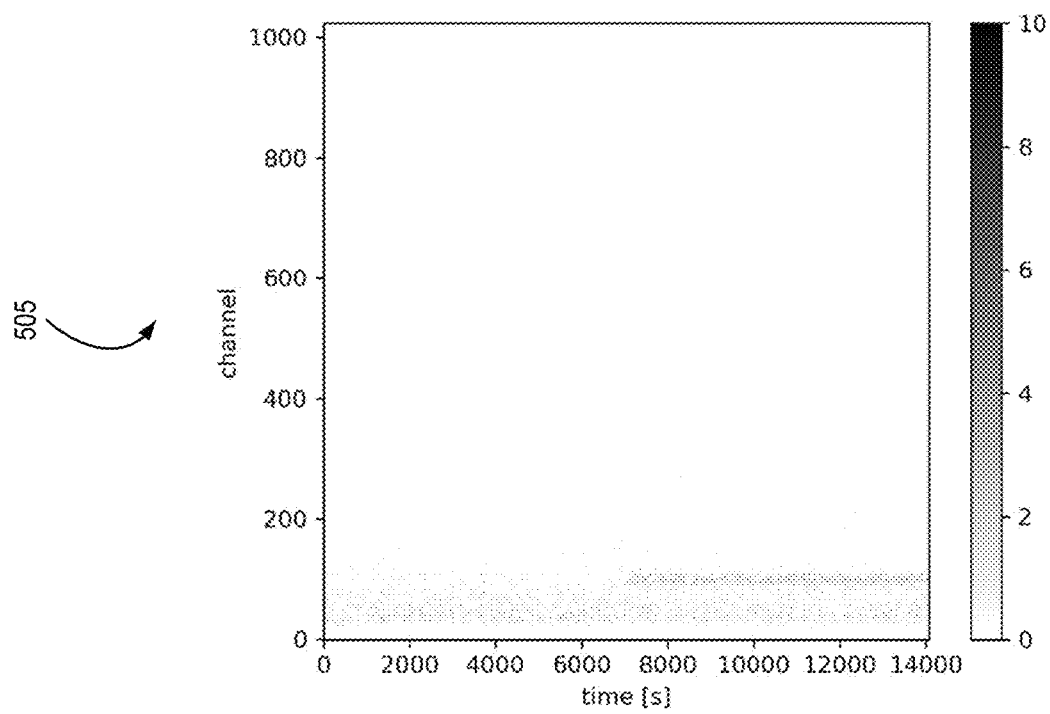
FIG. 5B illustrates an example of spectra from 1024 channels.
Figure 5A:
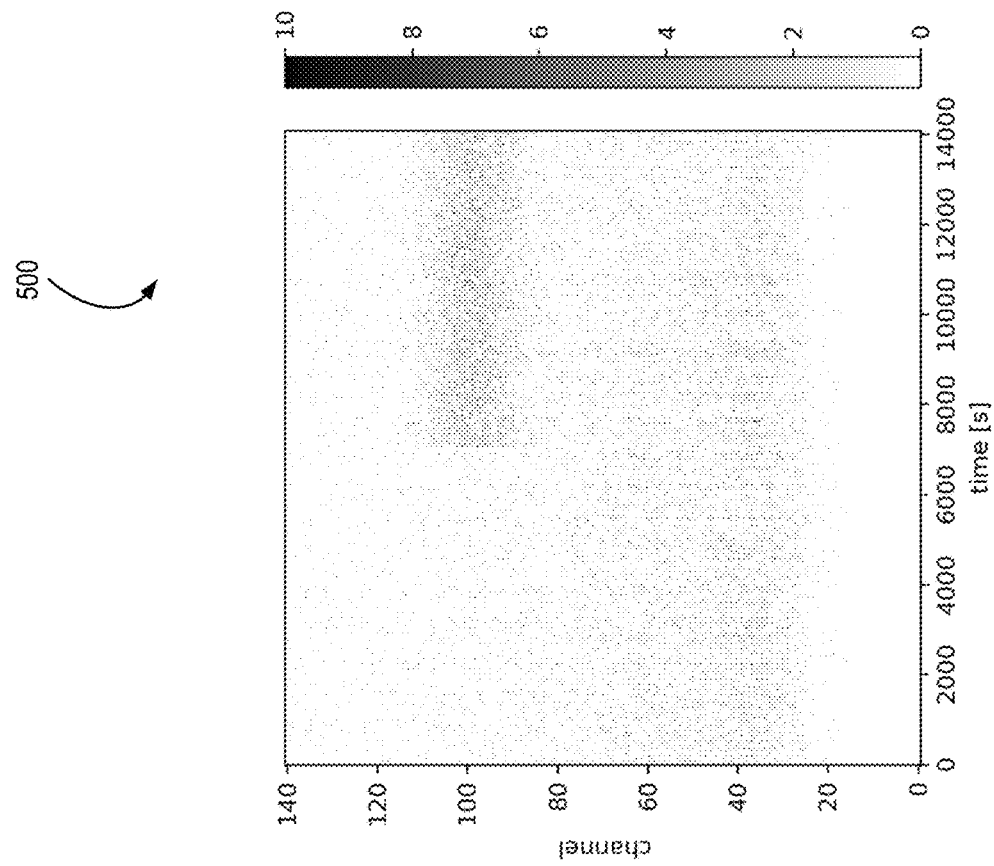
FIG. 5A illustrates an example of spectra from 20-140 channels.

The radiation spectrum from FIGS. 4A-4C may be used to create the spectra information illustrated by FIGS. 5A-5B, which illustrate an example of spectra from 20-140 channels 500 and an example of spectra from 1024 channels 505, respectively. For example, a two-dimensional (2D) figure could be derived from FIG. 4C if the counts are presented as the grayscale intensity. For anomaly detection, the neural network can memorize the patterns from the past and process the new signal to detect whether there is anomaly. For example, in FIGS. 5A-5B, up to 7077 seconds, there is background spectra and from 7077 seconds to 14077 seconds, there are background spectra plus source spectra. It is very clear that after 7077 seconds, a different pattern appears.

In another example, detector spectra data collected may be converted as a function of time to an image. The count of each channel may be converted to pixel intensity, and the source and background spectrum may be presented by a grayscale 2-D figure. Anomaly detection may be cast as a computer vision task. The neural network may memorize the patterns for background in the past and process the new signal to detect if there is anomaly. A sliding window may move in the image and the neural network may recognize the pattern within the window. The pattern may be stored as a vector in memory of each neuron, and the vector may come from the information within each window. For example, a 2D figure may be derived from 3D figure as the counts presented by grayscale intensity.

Figure 6:
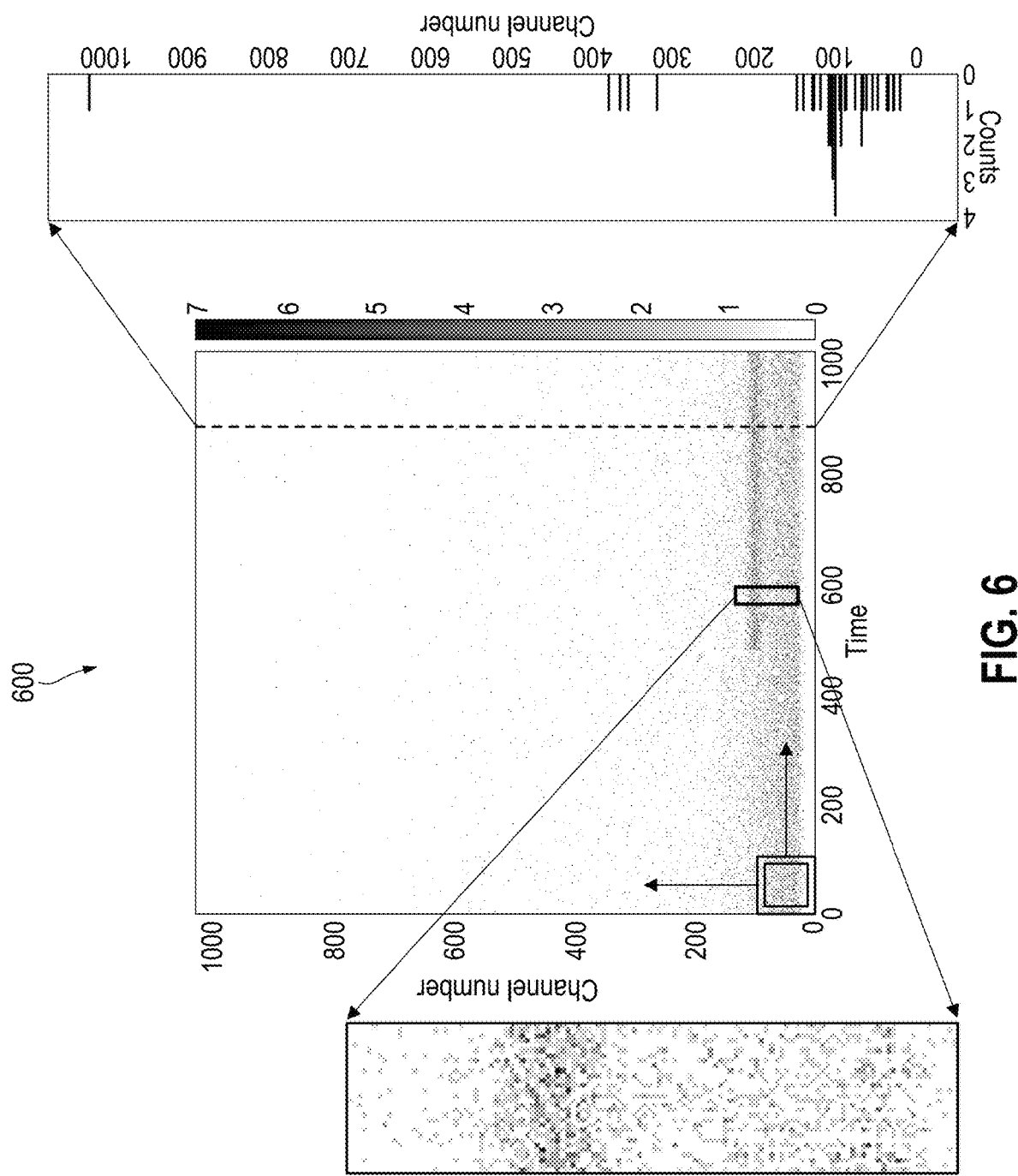
FIG. 6 illustrates an example of 1024 spectra presented by a 2D grayscale image.

FIG. 6 illustrates an example of 1024 spectra presented by a 2D grayscale image (i.e., 1024×1024 pixels) in which the x-axis denotes time and the y-axis denotes channel number. One spectrum is shown in the right part of the figure if the intensity in one pixel is unfolded to counts in the histogram. The left part of the figure shows a more clear view of channel 20-140. A window in the left bottom part of the middle image may slide in directions indicated by the arrows.

FIG. 6 illustrates an example 600 that presents the background spectra up to 512 seconds and, from 512 seconds to 1024 seconds, there are background spectra with injected source spectra. It is clear that after 512 seconds, a different pattern appears around the source channel.

In certain examples, two decisions may need to be made: the size of the sliding window; and the stride of sliding. In a given detection scenario, the window size generally defines the vector length and time it takes to detect anomaly. The stride generally determines the channel resolution for the source. Thus, there is typically a trade-off between the anomaly detecting accuracy, channel resolution, and the time needed for recognizing.

It will be appreciated that implementations may include implementing the disclosed neuromorphic architecture and SNN in a FPGA and training the architecture for processing anomaly detection.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers.

One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGAs, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A system for identifying anomalous nuclear radioactive sources, the system comprising:
   a radiation detector configured to collect spectra data corresponding to a radioactive source;
   a multi-channel analyzer configured to convert the collected spectra data to at least one two-dimensional (2D) image; and
   a neuromorphic architecture that includes a plurality of neurons configured to detect a radioactive anomaly based on the at least one 2D image.

2. The radioactive anomaly identification system of claim 1, wherein the neuromorphic architecture is a fully parallel neural network and the plurality of neurons includes a chain of identical neurons.

3. The radioactive anomaly identification system of claim 2, wherein the chain of identical neurons is configured to learn and recognize the collected spectra data processed as different patterns.

4. The radioactive anomaly identification system of claim 2, wherein each neuron in the chain of identical neurons is configured to store a prototype vector.

5. The radioactive anomaly identification system of claim 2, wherein each neuron in the chain of identical neurons is configured to learn and recall its pattern spontaneously.

6. The radioactive anomaly identification system of claim 5, wherein each neuron in the chain of identical neurons is configured to autonomously evaluate a distance between reference patterns stored in a memory and input vectors.

7. The radioactive anomaly identification system of claim 6, wherein the memory includes a storage device of the neuromorphic architecture.

8. The radioactive anomaly identification system of claim 6, wherein, responsive to the distance falling within a specified range for at least one neuron, the at least one neuron is configured to fire and return a decision.

9. The radioactive anomaly identification system of claim 8, wherein the specified range depends on the temporal and spatial background radiation variations.

10. The radioactive anomaly identification system of claim 8, wherein the decision includes at least one selected from the group consisting of: the distance, a category, and an identifier corresponding to the neuron that fired.

11. The radioactive anomaly identification system of claim 5, wherein the neuromorphic architecture is configured to learn a signature corresponding to the radiation detector.

12. The radioactive anomaly identification system of claim 11, wherein the neuromorphic architecture is further configured to differentiate the radioactive anomaly from the background based at least in part on the learned signature.

13. The radioactive anomaly identification system of claim 5, wherein the neuromorphic architecture is configured to memorize patterns from the background.

14. The radioactive anomaly identification system of claim 13, wherein the neuromorphic architecture is further configured to detect the radioactive anomaly based at least in part on the memorized patterns.

15. The radioactive anomaly identification system of claim 5, wherein each neuron in the chain of identical neurons is configured to recognize its pattern within a sliding window moving in the 2D image.

16. The radioactive anomaly identification system of claim 15, wherein the neuron is configured to store its pattern as a vector in a memory of the neuron.

17. The radioactive anomaly identification system of claim 16, wherein the sliding window determines the vector size.

18. The radioactive anomaly identification system of claim 1, wherein the 2D image has a first axis denoting time and a second axis denoting channel number.

19. The radioactive anomaly identification system of claim 18, wherein the count of each channel is converted to a pixel intensity.

20. The radioactive anomaly identification system of claim 18, further comprising 1,024 channels.

21. The radioactive anomaly identification system of claim 1, wherein the collected spectra data is presented as a three-dimensional (3D) histogram.

22. The radioactive anomaly identification system of claim 21, wherein the 3D histogram has a first axis denoting channel number, a second axis denoting a count, and a third axis denoting present time.

23. The radioactive anomaly identification system of claim 1, wherein the neuromorphic architecture comprises a parallel bus having bi-directional communication between the plurality of neurons.

24. The radioactive anomaly identification system of claim 1, wherein the neuromorphic architecture is field programmable gate array (FPGA)-based.

25. The radioactive anomaly identification system of claim 1, wherein the neuromorphic architecture comprises a display configured to visually display output results corresponding to the detected radioactive anomaly.

26. A portable unit comprising the radioactive anomaly identification system of claim 1.

27. An unmanned aerial vehicle (UAV) comprising the radioactive anomaly identification system of claim 1.

28. A method for identifying anomalous nuclear radioactive sources, the method comprising:
   a radiation detector collecting spectra data corresponding to a radioactive source;
   a multi-channel analyzer converting the collected spectra data to at least one two-dimensional (2D) image; and
   a neuromorphic architecture that includes a plurality of neurons detecting a radioactive anomaly based on the at least one 2D image.

29. The radioactive anomaly identification method of claim 28, wherein the neuromorphic architecture is a fully parallel neural network and the plurality of neurons includes a chain of identical neurons.

30. The radioactive anomaly identification method of claim 29, further comprising the chain of identical neurons learning and recognizing the collected spectra data processed as different patterns.

31. The radioactive anomaly identification method of claim 29, further comprising each neuron in the chain of identical neurons storing a prototype vector.

32. The radioactive anomaly identification method of claim 29, further comprising each neuron in the chain of identical neurons learning and recalling its pattern spontaneously.

33. The radioactive anomaly identification method of claim 32, further comprising each neuron in the chain of identical neurons autonomously evaluating a distance between reference patterns stored in a memory and input vectors.

34. The radioactive anomaly identification method of claim 33, wherein the memory includes a storage device of the neuromorphic architecture.

35. The radioactive anomaly identification method of claim 33, wherein, responsive to the distance falling within a specified range for at least one neuron, the at least one neuron firing and returning a decision.

36. The radioactive anomaly identification method of claim 35, wherein the specified range is an active influence field.

37. The radioactive anomaly identification method of claim 35, wherein the decision includes at least one selected from the group consisting of: the distance, a category, and an identifier corresponding to the neuron that fired.

38. The radioactive anomaly identification method of claim 32, further comprising the neuromorphic architecture learning a signature corresponding to the radiation detector.

39. The radioactive anomaly identification method of claim 38, further comprising the neuromorphic architecture differentiating the radioactive anomaly from the background based at least in part on the learned signature.

40. The radioactive anomaly identification method of claim 32, further comprising the neuromorphic architecture memorizing patterns from the background.

41. The radioactive anomaly identification method of claim 40, further comprising the neuromorphic architecture detecting the radioactive anomaly based at least in part on the memorized patterns.

42. The radioactive anomaly identification method of claim 32, further comprising each neuron in the chain of identical neurons recognizing its pattern within a sliding window moving in the 2D image.

43. The radioactive anomaly identification method of claim 42, further comprising the neuron storing its pattern as a vector in a memory of the neuron.

44. The radioactive anomaly identification method of claim 43, wherein the sliding window determines the vector size.

45. The radioactive anomaly identification method of claim 28, wherein the 2D image has a first axis denoting time and a second axis denoting channel number.

46. The radioactive anomaly identification method of claim 45, further comprising converting the count of each channel to a pixel intensity.

47. The radioactive anomaly identification method of claim 28, further comprising presenting the collected spectra data as a three-dimensional (3D) histogram.

48. The radioactive anomaly identification method of claim 47, wherein the 3D histogram has a first axis denoting channel number, a second axis denoting a count, and a third axis denoting present time.

49. The radioactive anomaly identification method of claim 28, wherein the neuromorphic architecture comprises a parallel bus having bi-directional communication between the plurality of neurons.

50. The radioactive anomaly identification method of claim 28, wherein the neuromorphic architecture is field programmable gate array (FPGA)-based.

51. The radioactive anomaly identification method of claim 28, further comprising a display of the neuromorphic architecture visually presenting output results corresponding to the detected radioactive anomaly.

52. A portable unit configured to perform the radioactive anomaly identification method of claim 28.

53. An unmanned aerial vehicle (UAV) configured to perform the radioactive anomaly identification method of claim 28.

54. One or more non-transitory, computer-readable media containing instructions that, when executed by one or more processors, cause the one or more processors to perform the radioactive anomaly identification method of claim 28.

* * * * *